United States Patent
Champion

(10) Patent No.: US 7,167,114 B2
(45) Date of Patent: Jan. 23, 2007

(54) MEMORY EFFICIENT INTERLEAVING

(75) Inventor: Mark Champion, Kenmore, WA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 10/959,281

(22) Filed: Oct. 5, 2004

(65) Prior Publication Data

US 2006/0071843 A1    Apr. 6, 2006

(51) Int. Cl.
*H03M 13/27* (2006.01)
(52) U.S. Cl. .......................................... 341/81; 711/157
(58) Field of Classification Search .................. 341/81; 711/157, 167, 168
See application file for complete search history.

(56) References Cited

U.S. PATENT DOCUMENTS

| | | | | |
|---|---|---|---|---|
| 6,553,517 B1* | 4/2003 | Prasad | .......................... | 714/702 |
| 6,598,198 B1* | 7/2003 | Furuta et al. | ................ | 714/763 |
| 6,625,763 B1* | 9/2003 | Boner | ......................... | 714/701 |
| 6,748,561 B1 | 6/2004 | Prasad | .......................... | 714/702 |
| 6,944,727 B1* | 9/2005 | Yokokawa | ................... | 711/157 |
| 6,964,005 B1* | 11/2005 | Hollums | ....................... | 714/752 |
| 2003/0149849 A1* | 8/2003 | Kim et al. | ................... | 711/157 |
| 2005/0050284 A1* | 3/2005 | Lee | .............................. | 711/157 |

* cited by examiner

*Primary Examiner*—Howard L. Williams

(57) ABSTRACT

A method and system using a single interleaver at a either a receiving device or a transmitting device where a first symbol set is read from the single interleaver and concurrently with a second symbol set is written to the single interleaver, and a controller that synchronizes the reading of the first symbol set from the interleaver and the writing of the second symbol set to the interleaver so that a particular symbol of the second symbol set is only written to a location of the interleaver after a particular symbol of the first symbol set has been read from the location. The controller may switch between orders, e.g., row order and column order, of reading and/or writing symbols to the single interleaver when all of the symbols for a particular set of symbols associated with the single interleaver have been read, according to another embodiment.

25 Claims, 5 Drawing Sheets

MEMORY EFFICIENT INTERLEAVING

BACKGROUND OF THE INVENTION

1. Field of the Invention

Embodiments of the present invention relate to the field of digital communication systems. More specifically, embodiments of the present invention relate to implementing interleavers and de-interleavers in a memory efficient manner.

2. Related Art

Frequently data that is transmitted over a channel from one electronic device (transmitting device) to another electronic device (receiving device) is corrupted, for example, due to channel impairments, such as noise, fading and jamming. Various methods, such as forward error correction (FEC), have been developed to correct the errors in the data at the receiving device (a classical example of FEC is the Reed-Solomon encoder/decoder). In one approach, FEC uses error free data around the bad data to correct the bad data. For example, the transmitting device may transmit a data stream of symbols "A B C D E F G H I J K L" to a receiving device. For the purposes of illustration, data shall be represented herein with symbols, such as "A," "B," "C," etc.

Errors, represented by "X"s, may be interjected into the data stream so that the receiving device receives a data stream of symbols "A X C D E X G H I X K L." Forward error correction may use good data, as represented by symbols "A," "C D E," "G H I," "K L," that is around the bad data to correct the bad data. However, if a sufficient number of errors occur within a relatively short period of time, there may not be enough good data around the bad data to correct the bad data. For example, if a device receives a data stream, such as "A B C X X X G H I J K L," where several symbols which are received in a short time span are in error, then there may not be enough good data in between the bad data to correct the bad data.

One approach to spreading out the errors in a data stream of symbols involves rearranging the order that the symbols are transmitted and received using interleavers. FIG. 1 is a block diagram of a system with electronic devices that use two interleavers. A system 100 as depicted in FIG. 1 can be used in one way communications such as the communication from a DVD player to a television, a satellite to a moon rover, etc. As depicted in FIG. 1, an electronic transmitting device 110 transmits symbol sets to an electronic receiving device 120 over a transmission channel 130. Electronic transmitting device 110 includes a source 112 that symbol sets are read from and electronic receiving device 120 includes a sink 122 for using the symbol sets that are received from electronic receiving device 110. Both electronic devices 110, 120 each include two interleavers 114, 116, 124, 126, as will be explained in more detail.

Interleavers exist in several types. One type is the block interleaver. The block interleaver consists of a square or a rectangular array of memory. Data, such as that represented by symbols, may be written to this memory array in row order and read from this memory array in column order, for example. In this way, consecutive symbols are distributed over time when transmitted. This process is performed prior to transmission of the data and a complementary process is performed after reception of the data. For example, in the event that electronic transmitting device 110 retrieves data stream of symbols "A B C D E F G H I J K L" (referred to herein as a "symbol set") from source 112, the data stream of symbols "A B C D E F G H I J K L" may be written to interleaver 114 in row order as depicted in Table 1 below:

TABLE 1

| data written to interleaver 114 in row order | | | |
|---|---|---|---|
| A | B | C | D |
| E | F | G | H |
| I | J | K | L |

However, the data is read from interleaver 114 in column order (e.g., "A E I B F J C G K D H L"), thereby interleaving the symbols, and transmitted to electronic receiving device 120 over transmission channel 130 where transmission errors may result in corruption of consecutive symbols associated with the data stream. A symbol set includes the number of symbols that an interleaver can hold, such as that depicted in Table 1 for example.

Electronic receiving device 120 receives data from electronic transmitting device 110 and de-interleaves the symbols in the opposite order. For example, the data stream of symbols "A E I B F J C G K D H L" is written to interleaver 124 in column order as depicted in Table 2 below.

TABLE 2

| data stream stored in interleaver 124 in column order | | | |
|---|---|---|---|
| A | B | C | D |
| E | F | G | H |
| I | J | K | L |

The data is read out of interleaver 124 in row order to obtain the data stream of symbols "A B C D E F G H I J K L" and written to sink 122. Interleavers 124, 126 are also known as "de-interleavers."

The nature of systems using block interleavers requires that no data be read from an interleaver until a full block of data has been written to an interleaver (e.g., the block interleaver is full). In a real-time system, symbols must continuously be written and read from the block interleaver concurrently. As a result, it is necessary to employ two interleavers (e.g., one for reading and one for writing and their roles ping-pong). This dual interleaver requirement exists in both the transmitting device and the receiving device. System 100 depicts this dual interleaver requirement. For example, electronic transmitting device 110 depicts interleaver 114 and interleaver 116. Similarly, electronic receiving device 120 depicts interleaver 124 and interleaver 126. Interleavers 114, 116, 124, 126 provide similar functionality, except that interleavers 114 and 116 are associated with electronic transmitting device 110 and interleavers 124 and 126 are associated with electronic receiving device 120.

When all of the symbols have been read from a particular interleaver, the roles of the interleavers are swapped. For example, as symbols are being read from one interleaver 114 associated with a device 110, other symbols are being written to the other interleaver 116 associated with the device 110. When all of the symbols associated with one of the interleavers 114 have been read, the interleavers 114, 116 are swapped (also referred to herein as "ping-pong"), thus, after swapping the interleavers, symbols are written to interleaver 114 and symbols are read from interleaver 116.

Memory is expensive and a considerable amount of memory is needed for implementing interleavers in real-time systems, such as video systems. Therefore, there is a need for efficiently using memory for implementing interleavers.

SUMMARY OF THE INVENTION

Accordingly, embodiments of the present invention provide memory efficient interleaving.

Embodiments of the present invention are directed to a method and system using a single interleaver where symbols of a first symbol set are read from the single interleaver and symbols of a second symbol set are written to the single interleaver before all the symbols of the first set have been read out. A controller synchronizes the reading of the first symbol set from the interleaver and the writing of the second symbol set to the interleaver so that a particular symbol of the second symbol set is only written to a location of the interleaver after a particular symbol of the first symbol set has been read from the location thereby making the location vacant.

By requiring only a single interleaver at the transmission end and the receiving end, memory resources are conserved. In one embodiment, the transmitter includes ordering data along with the start of the symbol set transmission so that the receiver can determine the proper ordering in which to store the data. If the interleavers are perfectly square in memory row/column organization, then such signaling is not required, according to one embodiment.

In one embodiment the controller switches between two orders, e.g., row order and column order, so that a particular symbols of the second symbol set is only written to a location of the interleaver after a particular symbol of the first symbol set has been read from the location. In other words, following the above example, the symbols of the first set are read in row order while the symbols of the second set are written in row order. The symbols of the second set would then be read in column order while symbols of a third set are written in column order and so forth. Analogous order occurs at the receiver end. The controller may switch between the orders when all of the symbols for a particular set of symbols associated with the single interleaver have been read, according to yet another embodiment. For example, the first set of symbols has been read from the single interleaver in row order. When all of the symbols of the first set of symbols, for example, have been read from the single interleaver, the controller can switch the order to read the second symbol set column wise, and so on as symbol sets are read from the single interleaver.

DETAILED DESCRIPTION OF THE INVENTION

Reference will now be made in detail to the preferred embodiments of the present invention, a method and system are described for implementing memory efficient interleaving, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

Figure 1:
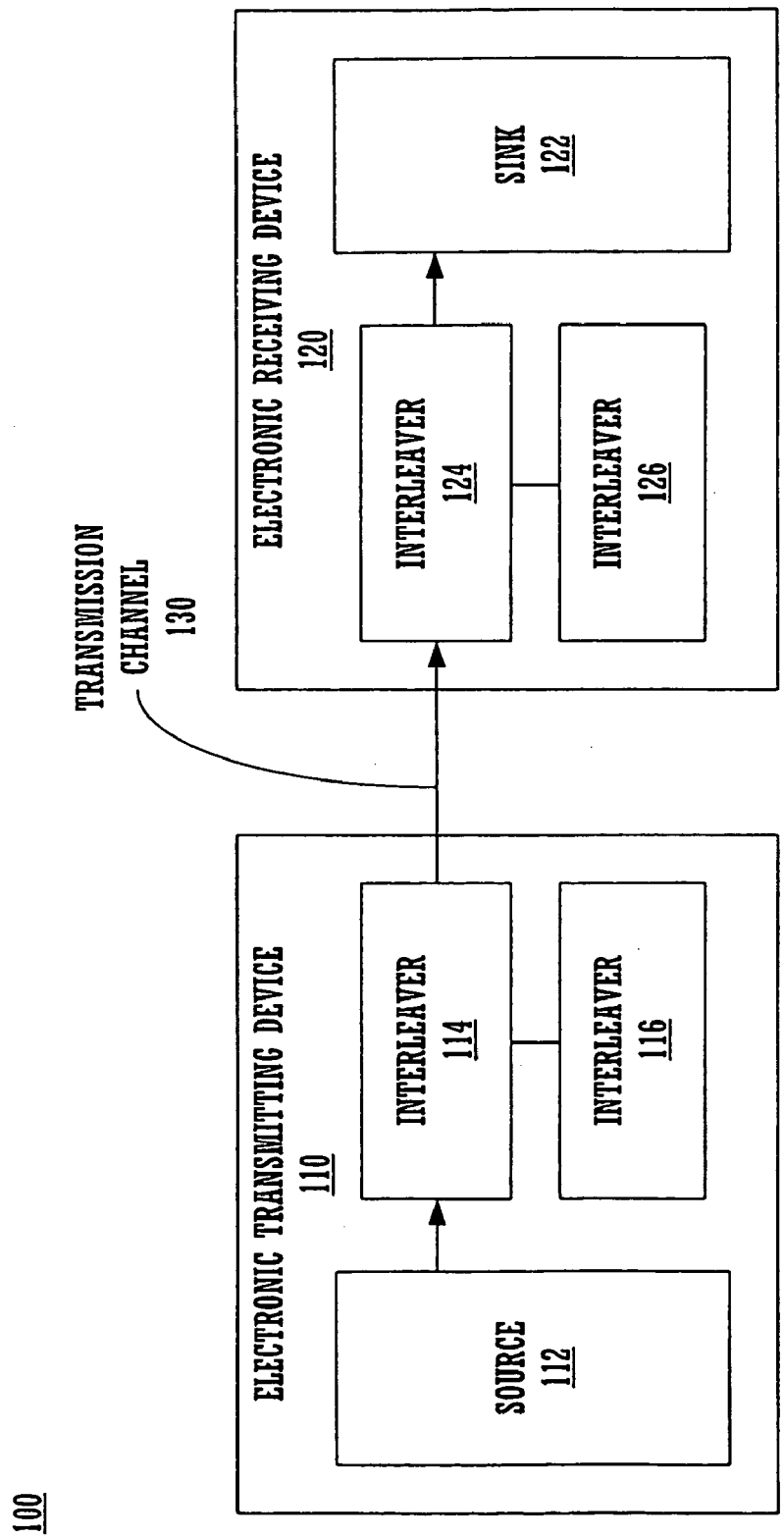
FIG. 1 is a block diagram of a system with electronic devices that each use two interleavers.
Figure 2:
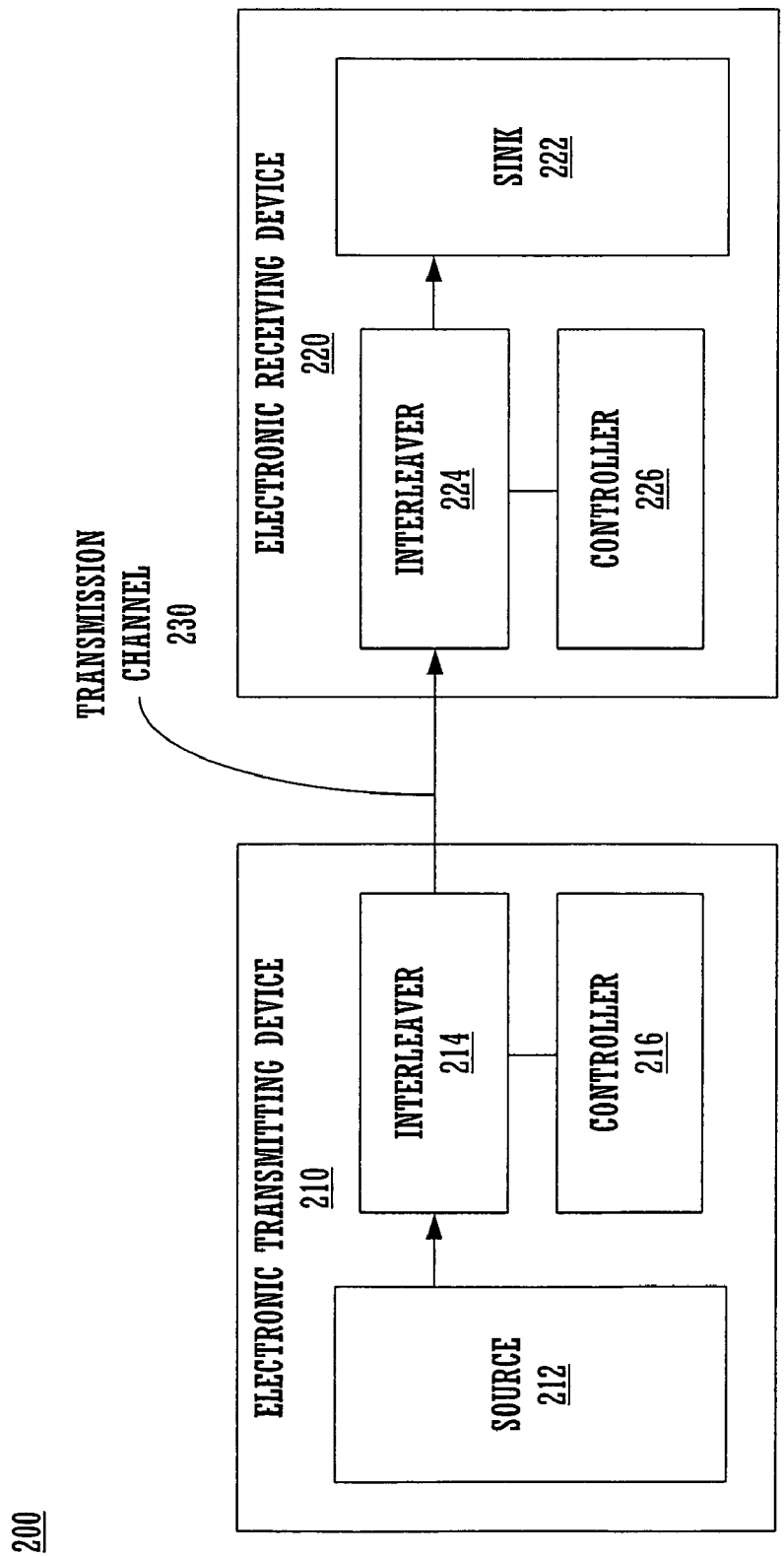
FIG. 2 is a block diagram of a system with electronic devices that use a single interleaver, in accordance with one embodiment of the present invention.

FIG. 2 is a block diagram of a system with electronic devices that each use a single interleaver, in accordance with one embodiment of the present invention. The blocks in FIG. 2 can be arranged differently than as illustrated and can implement additional or fewer features than what are described herein. Further, the features represented by the blocks in FIG. 2 can be combined in various ways.

As depicted in FIG. 2, system 200 includes an electronic transmitting device 210, an electronic receiving device 220, and a transmission channel 230. The electronic devices 210, 220 each include respectively an interleaver 214, 224 and a controller 216, 226. Electronic transmitting device 210 also includes a source 212 and electronic receiving device 220 includes a sink. Electronic transmitting device 210 transmits symbol sets to the electronic receiving device 220 over a transmission channel 230. Electronic transmitting device 210 includes a source 212 that symbol sets are read from and electronic receiving device 220 includes a sink 222 for using the symbol sets that are received from electronic transmitting device 210. Electronic transmitting device 210 and electronic receiving device 220 include respective single interleavers 214, 224 that symbol sets can be read from and written to, and controllers 216, 226 for controlling the reading and writing of symbol sets from/to the interleavers 214, 224. As depicted in FIG. 2, transmission channel 230 can be wired or wireless or a combination of both, according to one embodiment.

Figure 3A:
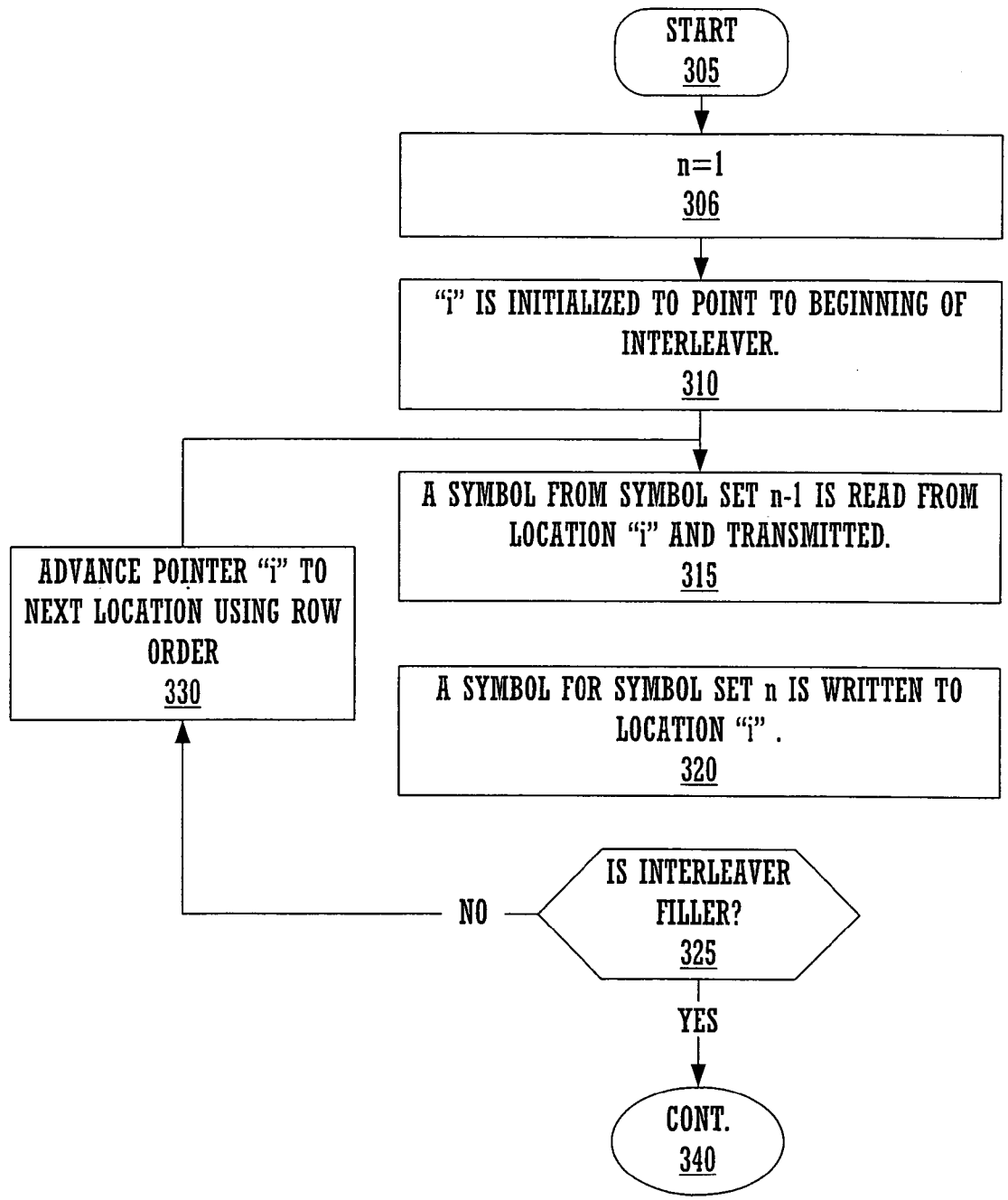
FIGS. 3A and 3B illustrate a flow diagram of a process of providing memory efficient interleaving, according to embodiments of the present invention.
Figure 3B:
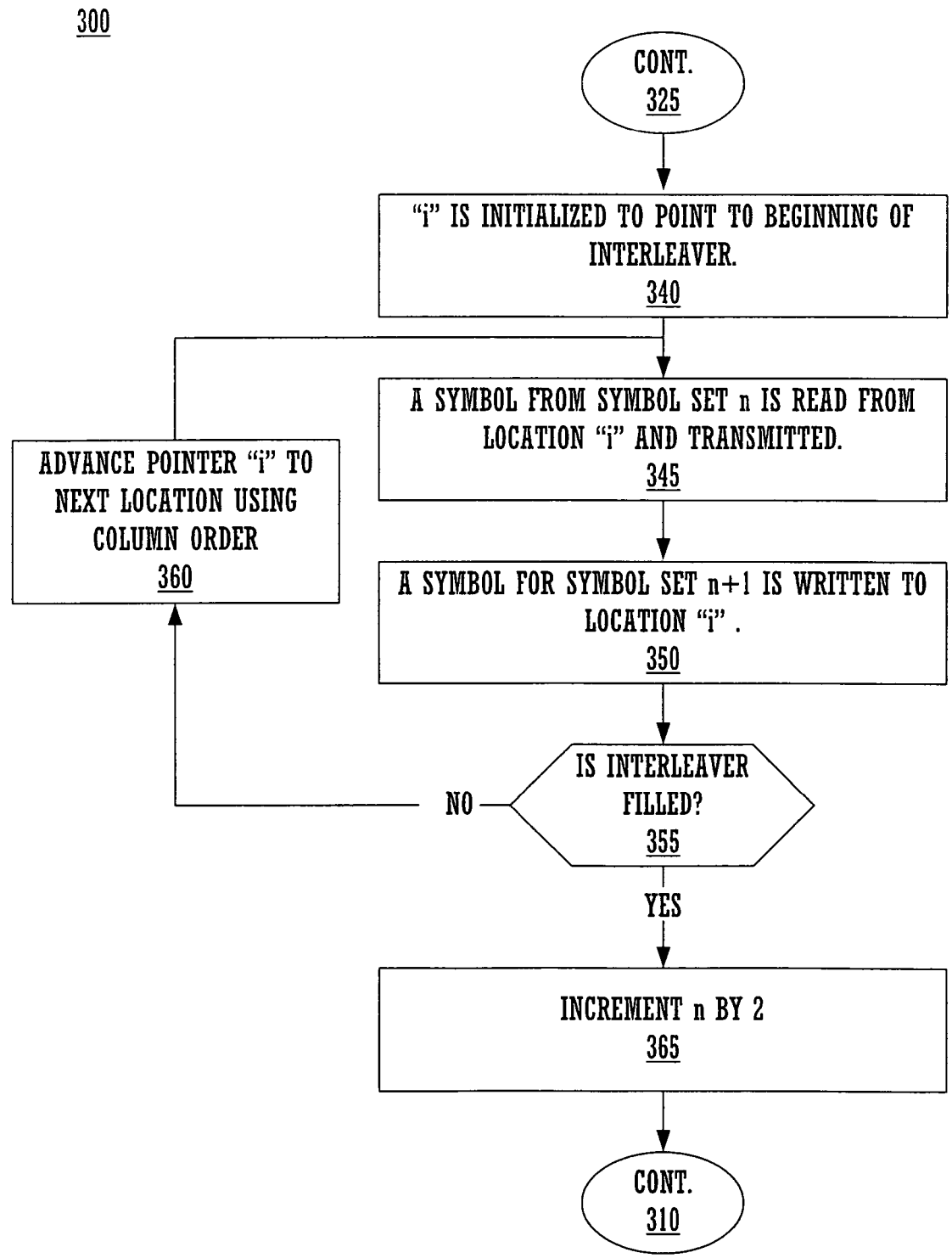

FIGS. 3A and 3B illustrate a flow diagram of processes 300 for providing memory efficient interleaving, according to embodiments of the present invention. FIGS. 3A and 3B is a flow diagram of a process 300 for providing memory efficient interleaving on either a transmitting or a receiving device, according to one embodiment. Although specific steps are disclosed in flowchart 300, such steps are exemplary. That is, embodiments of the present invention are well suited to performing various other steps or variations of the steps recited in flowchart 300. It is appreciated that the steps in flowchart 300 may be performed in an order different than presented, and that not all of the steps in flowchart 300 may be performed. All of, or a portion of, the embodiments described by flowchart 300 can be implemented using computer-readable and computer-executable instructions which reside, for example, in computer-usable media of a computer system or like device. For the purposes of illustration, the description of the steps depicted in flowchart 300 shall refer to the structures depicted in FIG. 2.

Flowchart 300 shall be used to first describe the function of the electronic transmitting device 210's use of a single interleaver 214 and then to describe the function of the electronic receiving device 220's use of a single interleaver 224. The functionality described by flowchart 300 can be implemented in a controller 216, 226.

Single interleavers 214, 224 can be square interleavers, according to one embodiment. A square interleaver contains the same number of rows and columns in its memory array. For example, square interleavers perform the same interleave function regardless of whether the symbols are written column wise to the interleavers 214, 224 and read row wise from the interleavers 214, 224 or whether the symbols are written row wise to the interleavers 214, 224 and read column wise from the interleavers 214, 224.

Assume that interleavers 214, 224 are 3×3 square interleavers and Table 3 depicts an example of a 3×3 interleaver where each of the locations where symbols can be stored is numbered for the purposes of discussing flowchart 300. More specifically, the first location of row 1 is numbered 1 the second location of row 1 is numbered 2, etc. Similarly, the first location of column 1 is numbered 1, the second location of column 1 is numbered 4, etc.

TABLE 3

Example of numbered locations for the purpose of facilitating discussion of flowchart 300 with respect to the square interleaver embodiment.

| 1 | 2 | 3 |
|---|---|---|
| 4 | 5 | 6 |
| 7 | 8 | 9 |

The following description of flowchart 300 will describe a method of using interleaver 214 to interleaver a first symbol set depicted by symbols A–I, a second symbol set depicted by symbols A'–I', and a third symbol set depicted by symbols A"–I", etc.

The process described by flowchart 300 is started (305), for example, by powering the electronic devices 210, 220 on and hitting the reset buttons associated with the electronic devices 210, 220. At this point in time, interleavers 214, 224 include extraneous data.

At step 306, a symbol set indicator "n" is initialized to 1.

At step 310, a pointer (e.g., "i") is initialized to the beginning of interleaver 214. For example, pointer "i" is initialized to point to location 1 as indicated in Table 3.

315–330, forms a loop for reading symbols associated with symbol set n−1 from interleaver 214 and transmitting those symbols to electronic device 220. As a location for interleaver 214 is made available due to a symbol being read and transmitted, a symbol for another symbol set n can be written to that location for interleaver 214.

At step 315, a symbol for symbol set n−1 is read from location "i" of interleaver 214 and transmitted to interleaver 224. For example, one symbol is transmitted each time step 315 is entered for "i"=1, 2, 3, etc. (refer to locations depicted in Table 3). Symbol set 0 (e.g., when n=1) includes extraneous data that was in interleaver 214 prior to this process 300 starting at step 305. For n=1, step 315 transmits the extraneous data associated with interleaver 214 to interleaver 224. As is well known in the art, interleavers 214, 224 can handle the extraneous data associated with the symbol set 0 for n=1. However, for subsequent symbol sets (e.g., when n=2, 3, etc.) valid symbols are obtained from source 212 and transmitted.

At step 320, a symbol for symbol set n is written to location "i" of interleaver 214. For example, when pointer "i" points to location 1, symbol "A" is obtained from source 212 and written to location 1 (refer to Table 3 for locations) of interleaver 214, when pointer "i" points to location 2, assume that a symbol "B" is obtained from source 212 and written to location 2 of interleaver 214, etc.

Symbols can be either data words, pixels, or data words formed from pixels, according to one embodiment. For example, symbol A may be a data word a pixel, or data words formed from pixels, For example, in the later case symbols A and B can represent a data word that was formed from a single pixel.

At decision box 325, a determination is made as to whether interleaver 214 is filled with symbols for symbol set n. If interleaver 214 is not filled, then processing can proceed to step 330. For example, if location 9 of interleaver 214 has not been filled with a symbol for symbol set n from source 212, then processing can continue to step 330. At step 330, the pointer "i" is advanced to the next location using row order. For example, if pointer "i" is pointing at location 1, then it is advanced to location 2, if pointer "i" is pointing at location 2, then it is advanced to location 3, etc. (refer to Table 3 for locations).

However, if a determination is made at decision box 325 that interleaver 214 is filled, then processing can proceed to step 340 (and thus the end of the symbol set has been reached). For example, if location 9 of interleaver 214 is filled with a symbol for symbol set n obtained from source 212, then processing can continue to step 340.

At this point, a first set of symbols from source 212 has been written to interleaver 214 row wise(e.g. A B C D E F G H I), as depicted in Table 4 below, which shows the contents of interleaver 214, according to one embodiment:

TABLE 4

| first set of symbols written to interleaver 214 row wise | | |
|---|---|---|
| A | B | C |
| D | E | F |
| G | H | I |

At step 340, a pointer (e.g., "i") is initialized to the beginning of interleaver 214. For example, pointer "i" is initialized to point to location 1 as indicated in Table 3.

345–360, forms a loop for reading symbols associated with symbol set n from interleaver 214 and transmitting those symbols to electronic device 220. As a location is made available due to a symbol being read and transmitted, a symbol for another symbol set n+1 can be written to that location. Whereas, the symbols, according to one embodiment, were read from and written to interleaver 214 in row order for steps 315–330, the symbols, according to one embodiment, are read from and written to interleaver 214 in column order for steps 345–360.

At step 345, a symbol for symbol set n is read from location "i" of interleaver 214 and transmitted to interleaver 224. For example, for location 1 of the first symbol set (e.g., n=1), symbol A is read and transmitted, for location 4 of the first symbol set, symbol D is read and transmitted, and so on such that the transmitted order is "A D G B E H C F I" (refer to Table 3). One symbol is transmitted each time step 345 is entered for "i"=1, 4, 7, 2, etc. (refer to locations depicted in Table 3).

At step 350, a symbol for symbol set n+1 is written to location "i" of interleaver 214. For example, when pointer "i" points to location 1, symbol A' is obtained from source 212 and written to location 1 (refer to Table 3 for locations) of interleaver 214, when pointer "i" points to location 4, assume that a symbol B' is obtained from source 212 and written to location 4 (column wise), etc. According to one embodiment, when pointer "i" points to location 5, symbol E' is written to position 5 and interleaver 214 will include part of a second symbol set (e.g., A', B', C', D', E') and part of the first symbol set (e.g., H, C, F, I) as depicted in Table 5 below.

TABLE 5 part of second set of symbols written to interleaver 214 column wise

| A' | D' | C |
|----|----|---|
| B' | E' | F |
| C' | H  | I |

Although Table 5 only depicts writing symbols A'–E' of the second set of symbols to interleaver 214, an entire second set of symbols, e.g. A'–I', may be written to interleaver 214, as will become more evident.

At step 355, if interleaver 214 is not filled with symbols for symbol set n+1, then continue to step 360. For example, if location 9 has not been filled with a symbol obtained from source 212, then continue to step 360. At step 360, advance the pointer "i" to the next location using column order. For example, if pointer "i" points at location 1, then it is advanced to location 4, if pointer "i" points at location 4, then it is advanced to location 7, etc. (refer to Table 3 for locations).

However, if it is determined at decision box 355 that location 9 has been filled with a symbol obtained from source 212 for symbol set n+1, then processing will continue to step 365 where n is incremented by 2. When it is determined at decision box 355 that the interleaver 214 has been filled with a second symbol set from source 212, interleaver 214 will contain, according to one embodiment, symbols as depicted in Table 6 below:

TABLE 6 second set of symbols written to interleaver 214 column wise

| A' | D' | G' |
|----|----|----|
| B' | E' | H' |
| C' | F' | I' |

Step 365 proceeds to step 310 where "i" is re-initialized to point to the beginning of interleaver 214. Step 310 proceeds to the loop formed by steps 315–330. The loop formed by steps 315–330 is repeated for the next value of n. For example, for n=3, "A' D' G' B' E' H' C' F' I'" (refer to Table 6) is transmitted each time step 315 is entered for "i"=1, 4, 7, etc. (Table 3 depicts locations). Further, after steps 315–330 are executed for n=3, interleaver 214 will contain, according to one embodiment, a third symbol set (e.g., A"–I") as depicted in Table 7 below:

TABLE 7 third set of symbols written to interleaver 214 row wise

| A" | B" | C" |
|----|----|----|
| D" | E" | F" |
| G" | H" | I" |

According to one embodiment, in steps 315–330 a first symbol set is read from the single interleaver 214 and a second symbol set is written to the single interleaver 214 and a controller 216 is used to control the reading of the first symbol set from the single interleaver 214 and the writing of the second symbol set to the interleaver 214 so that the symbols of the second symbol set are written to the single interleaver 214 concurrently with symbols of the first symbol set being read from the single interleaver 214. Steps 345–360 perform similar processing with respect to the second and third symbol set for the single interleaver 214 and the controller 216.

Although many of the embodiments herein are described with regards to interleaver 214 and controller 216, interleaver 224 and controller 226 can perform complementary processes to that performed by interleaver 214 and controller 216. For example, just as a method implemented using flowchart 300 can be used to implement single interleaver 214 and controller 216, flowchart 300 can also be used to implement single interleaver 224 and controller 226, according to another embodiment. In this case, the method described by flowchart 300 can be implemented in controller 226 on the electronic receiving device 220. Instead of receiving symbols from source 212 as is the case for interleaver 214, interleaver 224 can receive symbols transmitted by the electronic transmitting device 210 from interleaver 214 over transmission channel 230. Similarly, instead of transmitting symbols over transmission channel 230 as is the case for interleaver 214, interleaver 224 can write symbols to sink 222.

Further, according to one embodiment, controllers 216, 226 can be in phase or out of phase. For example, controllers 216 and 226 can be "in phase" by both implementing step 330 using row order and both implementing step 360 using column order. Alternatively, controllers 216 and 226 can be "out of phase" by using different orders for implementing steps 330 and 360. For example, one of them (216, 226) could implement step 330 using row order and the other using column order and so on with step 360.

As a first set of symbols is read from interleaver 214, a symbol for a second set of symbols can be written concurrently to the vacated location where the symbol for the first set of symbols was read from the interleaver 214. In so doing, a particular symbol of the second set of symbols is written to the single interleaver 214 before all of the first set of symbols are read from the single interleaver 214, according to one embodiment. In this manner, both read and write functions can be performed concurrently for transmitting interleavers and/or receiving interleavers.

For example, as symbol A for the first set of symbols is being read from interleaver 214 (refer to table 4 for interleaver 214) symbol A' of the second set of symbols can be written to the interleaver 214. In this case, assume that as the first set of symbols (e.g., A–I) is being read from interleaver 214 and transmitted (step 315), a second set of symbols (e.g., A'–I') is written to interleaver 214 and transmitted (320). Similar function is performed at steps 345 and 350 respectively. Similar processing can be performed by interleaver 224. In so doing, single interleavers 214, 224 can be shared for read and write functions.

According to one embodiment, the controller 216 can determine when and how to switch between the two orders (row or column). For example, after all of the symbols for one set of symbols have been written (320) to an interleaver 214 (325), the controller 216 can switch (345–360) the order for writing (350) the next set of symbols to the interleaver 214.

At the transmitting interleaver 214, a symbol set can be written in row order and read in column order. At the receiving interleaver 224, the same symbol set can be written in row order and read in column order. However, the receiving interleaver 224 would produce the same output if it were written in column order and read in row order. This does not require any coordination of read and/or write orders between the transmitting interleaver 214 and the receiving interleaver 224 for the square interleaver embodiment.

Interleavers are typically sized to contain thousands of symbols. If a 2,000 symbol interleaver is desired, a square interleaver that contains exactly 2,000 symbol cannot be used because there is no integer number for rows and columns that will result in exactly a 2,000 symbol square interleaver. In this case, the symbol set can be reduced to 1936 symbols (44 squared), for example, or increased to 2025 symbols (45 squared), for example, to allow the use of a square interleaver. However, if a rectangular interleaver is used, the size could be 1998 (37×54), 2000 (50×40) or 2001 (29×69), for example. As can be seen, there are more choices in sizes when using a rectangular interleaver.

Interleavers 214, 224 can be rectangular interleavers, according to one embodiment. For example, a first set of symbols can be written (320) to interleaver 214 in row order. After decision box 325, interleaver 214 can include a first set of symbols as depicted in Table 8, according to one embodiment:

TABLE 8 first set of symbols written to interleaver 214 in row order.

| A | B | C | D |
|---|---|---|---|
| E | F | G | H |
| I | J | K | L |

As the first set of symbols are read and transmitted (345) from interleaver 214 in column order (e.g., "A E I B F J C G K D H L") and a second set of symbols, depicted with single primes, can be written (350) to interleaver 214 in column order, for example, as depicted in Table 9 according to one embodiment:

TABLE 9 second set of symbols written to interleaver 214 in column order

| A' | D' | C | D |
|----|----|---|---|
| B' | E' | G | H |
| C' | F' | K | L |

Although Table 9 only depicts writing symbols A'–F' of the second set of symbols to interleaver 214, an entire second set of symbols, e.g. A'–L', may be written to interleaver 214.

A controller 216 controls the reading 315, 345 of one set of symbols from the single interleaver 214 with the writing 320, 350 of another set of symbols from the single interleaver 214, according to one embodiment. As already stated, a controller 216 may switch between orders when, for example, all of the symbols for a particular set of symbols associated with the respective interleavers 214 have been read and the subsequent set has been written. For example, after decision box 325 determined that all of the symbols of the first set of symbols were written (320) to interleaver 214, the order was switched from row order to column order. Further, when a determination is made (355) that the first set of symbols has been read and transmitted (345) from interleaver 214 and a second set of symbols has been written (350) to interleaver 214, the order can be switched back to row order and a third set of symbols, which are denoted with double primes, are written (320) into the locations that the second set of symbols had been read (315) from, as depicted in Table 10 below, according to one embodiment:

TABLE 10 third set of symbols written to interleaver 214 in row order.

| A" | B" | C" | D" |
|----|----|----|----|
| E" | F" | G" | H" |
| C' | F' | I' | L' |

Although Table 10 only depicts writing symbols A"–H" of the third set of symbols to interleaver 214, an entire third set of symbols, e.g. A"–L", may be written to interleaver 214.

A controller 216 associated with a transmitting interleaver 214 can associate synchronization information with the first symbol from a particular set of symbols and the controller 226 associated with the receiving interleaver 220 can use the synchronization information to determine the order in which to store the particular set of symbols, according to one embodiment. The respective controllers 216, 226 associated with the transmitting and receiving interleavers 214, 224 can use the synchronization information to determine how to switch between the orders, according to yet another embodiment.

For example, with the rectangular embodiment a first set of symbols was written to interleaver 214 row wise (refer to Table 8), a second set of symbols was written to interleaver 214 column wise (refer to Table 9), and a third set of symbols was written to interleaver 214 row wise (refer to Table 10). Regardless of what set of symbols (e.g., first, second, third, etc.) was written to an interleaver 214, the first symbol is written to the interleaver 214 in the same location, such as the upper left corner. More specifically, in the case of the first set of symbols, the symbol A is the first symbol and it was written in the upper left hand corner of interleaver 214 (refer to Table 8), in the case of the second set of symbols, the symbol A' is the first symbol and it was written in the upper left hand corner of interleaver 214 (refer to Table 9), and so on.

In this case, synchronization information indicating the order (e.g., row wise, column wise) that a particular set of symbols was written to an interleaver may be associated with the first symbol of a particular set of symbols and a controller may use the synchronization information to determine the de-interleaving order for each set of symbols, according to one embodiment. For example, controller 216 can associate synchronization information with the symbol A where the synchronization information indicates that the first set of symbols was written to interleaver 214 (associated with the transmitting interleaver) row wise and controller 216 (associated with the receiving interleaver) can use this synchronization information to determine that the first set of symbols was written to interleaver 214 row wise.

Figure 4:
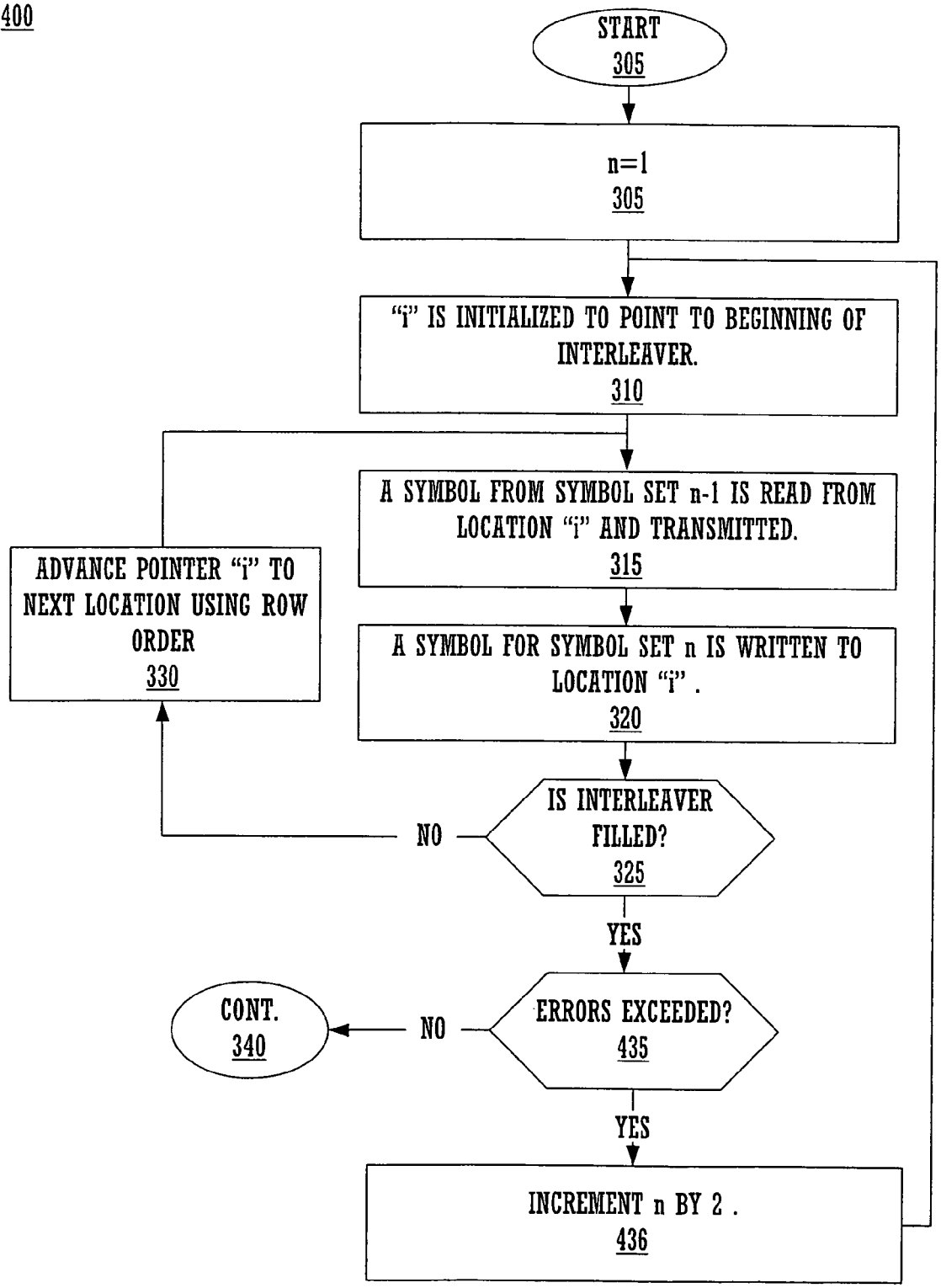
FIG. 4 illustrates a flow diagram of a process of providing memory efficient interleaving, according to embodiments of the present invention.

The controllers 216, 226 may analyze a particular set of symbols to determine if that set of symbols has been received with an acceptable or fewer number of errors and use that fact to determine whether to switch orders, according to yet another embodiment. FIG. 4 is a block diagram of logic that can be used for switching orders if the number of detected errors in the received symbol set does not exceed some acceptable limit, according to one embodiment.

FIG. 4 illustrates a flow diagram of processes 400 for providing memory efficient interleaving, according to embodiments of the present invention. FIG. 4 is a flow diagram of a process 400 for providing memory efficient interleaving on either a transmitting or a receiving device, according to one embodiment. Although specific steps are disclosed in flowchart 400, such steps are exemplary. That is, embodiments of the present invention are well suited to performing various other steps or variations of the steps recited in flowchart 400. It is appreciated that the steps in flowchart 400 may be performed in an order different than presented, and that not all of the steps in flowchart 400 may be performed. All of, or a portion of, the embodiments described by flowchart 400 can be implemented using computer-readable and computer-executable instructions which reside, for example, in computer-usable media of a computer system or like device. For the purposes of illustration the description of the steps depicted in flowchart 400 shall refer to the structures depicted in FIG. 2.

At decision box 435, if a set of symbols was read (315) in a particular order from an interleaver 214, 224 and a greater number of errors than what are expected are found, for example, then the alternating of orders can be skipped by proceeding back to step 310. More specifically, assume that symbols from an interleaver 214 are read row wise and analyzed for errors. If a greater number of errors than what is acceptable are found, the controller 216 can increment n (436) and read the next set of symbols row wise, thus, skipping the alternation of orders that would have occurred by entering steps 340–360. If acceptable or fewer number of errors are found, decision box 435 can proceed to step 340 and the order is switched. Although the above example was described with reference to steps 315–435, similar processing can be performed for steps 345–365. For example, if interleaver 214 is reading symbols column wise (345–360) and a greater number of errors than what is acceptable are found, the controller 216 can cause the interleaver 214 to read the next set of symbols column wise by proceeding back to step 345, thus, skipping the alternation of orders.

Interleavers 214, 224 do not need to be filled with symbols in order to interleave the symbols, according to one embodiment. For example, referring to Table 4, interleaver 214 may still interleaver even if symbol "I" were not written to interleaver 214. Similarly, referring to Table 8, interleaver 214 may still interleave even if symbol "L" were not written to interleaver 214. A square or a rectangular interleaver can constrain the number of symbols associated with a set. The ability to eliminate the first and/or the last symbols associated with the interleaver, for example, provides flexibility in designing the interleaver for a particular size, according to one embodiment.

The foregoing descriptions of specific embodiments of the present invention, a method and system for reading and writing symbols using a single interleaver thereby allowing memory efficient interleaving, have been presented for purpose of illustration and description. They are not intended to be exhaustive or to limit the invention to the precise form disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A transmitting/receiving device comprising:
   a single interleaver, wherein a first symbol set is read from said single interleaver and a second symbol set is written to said single interleaver wherein a first order is associated with said interleaver for reading said first symbol set from said interleaver and a second order is associated with said interleaver for writing said second symbol set from said interleaver; and
   a controller that controls the reading of said first symbol set from said interleaver and the writing of said second symbol set to said interleaver so that symbols of said second symbol set are written to said single interleaver concurrently with symbols of said first symbol set being read from said single interleaver wherein said controller switches between said first order and said second order.

2. A transmitting/receiving device as described in claim 1 wherein said controller controls the reading of said first symbol set with the writing of said second symbol set so that a particular symbol of said second symbol set is written to said single interleaver before all of the symbols associated with said first symbol set are read from said single interleaver.

3. A transmitting/receiving device as described in claim 1 wherein said controller controls the reading of said first symbol set with the writing of said second symbol set so that a particular symbol of said second symbol set is only written to a location of said interleaver after a particular symbol of said first symbol set has been read from said location.

4. A transmitting/receiving device as described in claim 1, wherein second symbol set is written to a location of said interleaver after a particular symbol of said first symbol set has been read form said location.

5. A transmitting/receiving device as described in claim 4 wherein an interleaving order for a particular set of symbols is associated with a symbol associated with said particular set of symbols and said controller uses said interleaving order information to determine a manner in which to switch between said orders, wherein said interleaving order can be associated with any symbol associated with said particular set of symbols.

6. A transmitting/receiving device as described in claim 4 wherein said controller switches between said first order and said second order if said symbols are received with an acceptable or fewer number of errors.

7. A transmitting/receiving device as described in claim 1, wherein said controller switches between said first order and said second order when all of the symbols associated with said first symbol set have been read.

8. A transmitting/receiving device as described in claim 1 wherein said first order is selected form a group consisting of reading column wise and reading row wise.

9. A transmitting/receiving device as described in claim 1 wherein said second order is selected from a group consisting of writing column wise and writing row wise.

10. A transmitting/receiving device as described in claim 1 wherein said interleaver is one of a square interleaver and a rectangular interleaver.

11. A transmitting/receiving device as described in claim 1 wherein said symbols are one of data words, pixels, and data words formed from pixels.

12. A method for memory efficient interleaving comprising:
    reading a first symbol set from and concurrently writing a second symbol set to a single interleaver wherein a first order is associated with said interleaver for reading said first symbol set from said interleaver and a second order is associated with said interleaver for writing said second symbol set from said interleaver; and
    controlling the reading of said first symbol set from said interleaver and the writing of said second symbol set to said interleaver so that symbols of said second symbol set are written to said single interleaver concurrently with symbols of said first symbol set being read from said single interleaver wherein said controller switches between said first order and said second order.

13. A method as described in claim 12, wherein said controller controls the reading of said first symbol set with the writing of said second symbol set so that a particular symbol of said second symbol set is written to said single interleaver before all of the symbols associated with said first symbol set are read from said single interleaver.

14. A device method as described in claim 12, wherein said controlling the reading of said first symbol set with the writing of said second symbol set further includes controlling so that a particular symbol of said symbol set is only written to a location of said interleaver after a particular symbol of said first symbol set has been read from said location.

15. A method as described in claim 12, wherein said second symbol set is only written to a location of said interleaver after a particular symbol of said first symbol set has been read from said location.

16. A method as described in claim 15 wherein an interleaving order for a particular set of symbols is associated with a symbol associated with said particular set of symbols and said controller uses said interleaving order information to determine a manner in which to switch between said orders, wherein said interleaving order can be associated with any symbol associated with said particular set of symbols.

17. A method as described in claim 15 wherein said controller switches between said first order and said second order if said symbols are not received with a prescribed tolerance of errors.

18. A method as described in claim 12 wherein said controlling further comprises switching between said first order and said second order when all of the symbols associated with said first symbol set have been read.

19. A method as described in claim 12 wherein said first order is selected from a group consisting of reading column wise an dreading row wise.

20. A method as described in claim 12 wherein said second order is selected from a group consisting of writing column wise and writing row wise.

21. A method as described in claim 12 wherein said interleaver is a square interleaver.

22. A computer-usable medium having computer-readable program code embodied therein for a method of memory efficient interleaving, the method comprising:

reading a first symbol set from and writing a second symbol set to a single interleaver wherein a first order is associated with said interleaver for reading said first symbol set from said interleaver and a second order is associated with said interleaver for writing said second symbol set from said interleaver; and controlling the reading of said first symbol set from said interleaver and the writing of said second symbol set to said interleaver so that symbols of said second symbol set are written to said single interleaver concurrently with symbols of said first symbol set being used from said single interleaver wherein said controller switches between said first order and said second order.

23. A computer-usable medium as described in claim 22, wherein said controlling further includes switching between said first order and said second order so that a particular symbol of said second symbol set is only written to a location of said interleaver after a particular symbol of said first symbol set has been read from said location.

24. A computer-usable medium as described in claim 22, wherein said controlling further includes switching between said first order and said second order when all of the symbols associated with said first symbol set have been read.

25. A computer-usable medium as described in claim 22 wherein synchronization information is associated with a first symbol of a particular set of symbols associated with said interleaver and said controller uses said synchronization information to determine a manner in which to switch between said orders.

* * * * *